Figure 2:
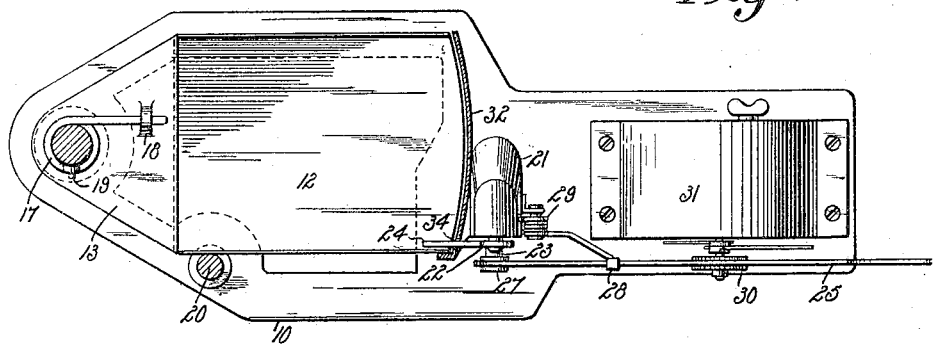

E. W. DANA.
CHICKEN FEEDER.
APPLICATION FILED MAR. 29, 1916.

1,211,097.

Patented Jan. 2, 1917.

UNITED STATES PATENT OFFICE.

EDGAR WARD DANA, OF PLATTEVILLE, WISCONSIN.

CHICKEN-FEEDER.

1,211,097.

Specification of Letters Patent.

Patented Jan. 2, 1917.

Application filed March 29, 1916. Serial No. 87,470.

*To all whom it may concern:*

Be it known that I, EDGAR W. DANA, a citizen of the United States, and a resident of Platteville, in the county of Grant and State of Wisconsin, have invented a new and Improved Chicken-Feeder, of which the following is a full, clear, and exact description.

General objects of my invention are to provide a chicken feeder in which a plurality of feed pans will be automatically released at predetermined intervals; and to provide a chicken feeder in which a feed pan will be given movement to effectively scatter the feed.

More specific objects of the invention are to provide means to protect the feed in the pans until the latter are released; and to provide a chicken feeder of the class referred to and its controlling means, simple in construction and reliable in operation and which may be employed in connection with an ordinary clock movement to effect release of the pans.

The invention will be particularly explained in the specific description following.

Reference is to be had to the accompanying drawings forming a part of this specification in which similar reference characters indicate corresponding parts in all the views.

Figure 1:
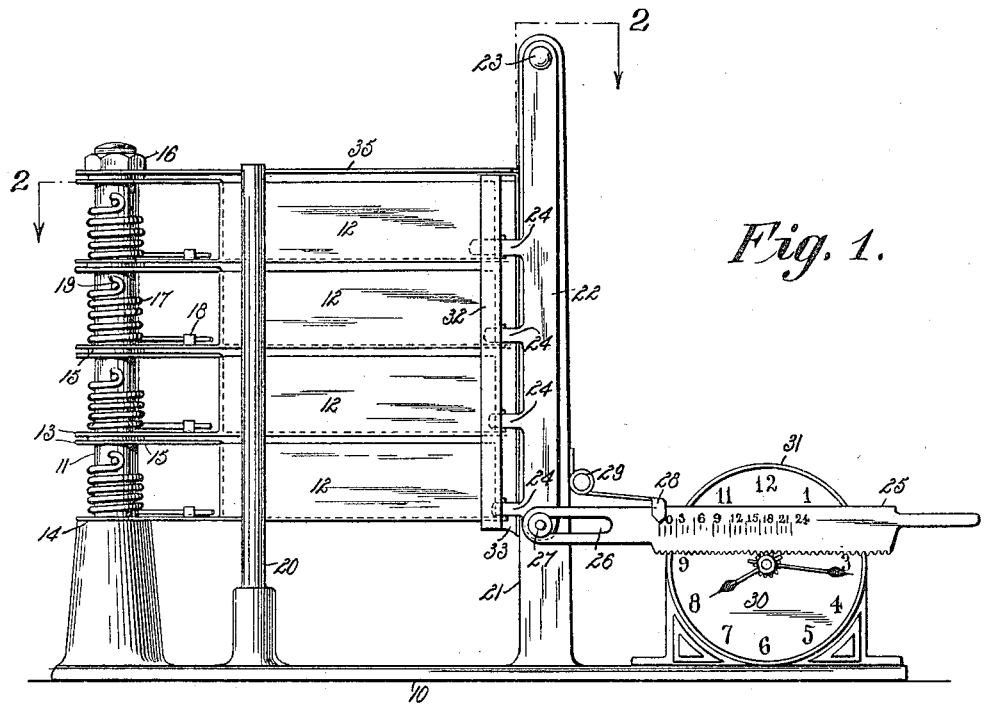
Figure 3:
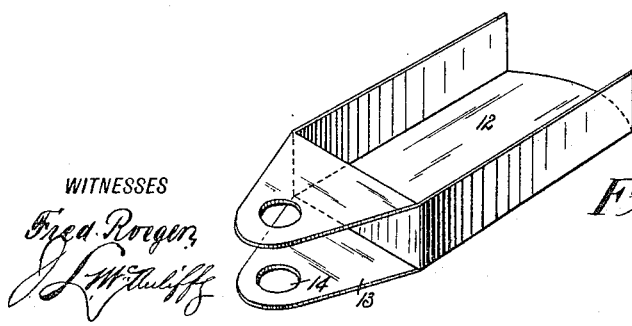

Figure 1 is a side elevation of a chicken feeder embodying my invention; Fig. 2 is a plan view partly in section on the line 2—2, Fig. 1; Fig. 3 is a perspective view of one of the pans.

In carrying out my invention in the form given in the illustrated example, a suitable base 10 is provided on which is a pivot post 11 and on said post a series of pans 12 are pivoted one above another, preferably by forming parallel flanges 13 thereon at one end. The bottom flange 13 of the lowermost pan may rest on a shoulder 14 on the post 11 and washers 15 may be employed, if desired, between the flanges 13 of the successively higher pans. On the top of the post a retaining nut 16 is provided.

For each pan 12 a separate coil spring 17 is provided on the post 11, one arm of the spring being engaged in a keeper 18 on the pan and the other end of the spring being fastened by a pin 19, or the like, to the said post. When the pans are swung to the position one above another, the springs 17 are placed under tension and have a tendency to swing the pans laterally. When the outer end of the pan is open so that the pan swings under action of a spring 17, the feed will be effectively scattered, the pan being swung through almost a complete circle to a stop post 20.

On the second post 21, near the top, the upper end of a restraining bar 22 is pivoted as at 23 and on said bar a plurality of lateral arms 24 project to overlap the adjacent sides of the pans 12 to restrain the said pans against movement. The relative length of the arms 24 is such as to release the pans in succession as the bar 22 is swung through an angle under the action of the releasing mechanism.

To release the pans 12, bar 24 is connected with a rack bar 25 by a slot and pin connection, said rack bar having a slot 26 and there being a pin 27 extending through the slot from the bar 24. A pointer 28 is secured to the post 21 or other convenient fixed member, and a spring coil 29 tends to maintain the pointer in position adjacent to the said rack bar. The teeth of the rack bar mesh with a pinion 30 on the hour hand of a clock movement, indicated generally by the numeral 31 and here shown as a known form of clock.

A scale is produced on the face of the rack bar 25, the said scale having a relation to the peripheral travel of the pinion 30. In setting the device for automatic action by the clock movement, the rack bar 25 will be so positioned relatively to the restraining bar 22 that a given longitudinal movement of said rack bar will trip the bar 22 at the predetermined hour. For instance, if at eight in the evening, the device is to be set to release a pan at six a. m., the rack bar 25 will be positioned with the pointer 28 at the tenth mark in the graduation on the said bar.

The ends of the pans are protected by a fixed vertical shield 32, suitably secured to the post 21 by a bracket plate 33. The top pan is protected by a cover plate 35 beneath which the pans are disposed when in the restrained position. The shield 32 is provided with slots 34 through which the arms 24 extend for engaging the respective pans.

I wish to state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention I claim as new, and desire to secure by Letters Patent:

1. A feeder, including a plurality of feed pans, means for separately moving said pans laterally, restraining means for the pans, and unitary means common to all the pans to release said pans from the restraining means at predetermined intervals to permit movement of the pans by the first-mentioned means.

2. A feeder, including a plurality of pivotally mounted feed pans, means to swing said pans on their pivots to discharge the feed therefrom under centrifugal force, and unitary means common to all of said pans to release said pans in succession at predetermined intervals, said last-mentioned means having separate members engaging the several pans and adapted to disengage the latter in succession.

3. In a feeder of the class referred to, a pivotally mounted feed pan, spring means to swing said pan on its pivot, restraining means engageable with the pan to prevent movement thereof on its pivot, and a continuously driven motor adapted to disengage the restraining means to release the pan after a predetermined period of operation of the motor.

4. In a feeder of the class described, a feed pan presenting an open top and an open free end and mounted to swing in an arc to discharge the contents of the pan by centrifugal force, spring means to swing the pan, means to restrain the pan from movement by said spring means, a fixed guard positioned to close the open end of the pan when the latter is in the restrained position, a fixed cover beneath which the pan is positioned when restrained, and means operable after a predetermined period to release the pan and permit the spring means to swing the pan away from the restrained position adjacent to the cover and guard.

5. A feeder, including a plurality of feed pans pivotally mounted one above another for separate swinging movement, separate spring means to swing said pans, a restraining bar having a series of pan-engaging arms of different lengths, said bar being pivotally mounted whereby to swing through an angle to successively disengage the said arms from the pans, and means operable after a predetermined period to give a releasing movement to said restraining bar.

6. A feeder including a plurality of pivotally mounted feed pans, means for separately swinging said feed pans on their pivots, the pans having open ends to discharge feed under centrifugal force, a stop to arrest the swinging movement of the pans, restraining means to hold said pans against pivotal movement, and unitary means common to all the pans to release the pans from the restraining means at predetermined intervals.

7. A feeder including a plurality of pivotally mounted feed pans, means to separately swing said pans on their pivots, means to restrain said pans against swinging movement, means to release said restraining means and including a graduated rack bar having a slot and pin connection with the restraining means, a pointer adjacent to the graduation of said rack bar, a pinion with which the said rack bar is adapted to be engaged, and a clock movement to actuate said pinion.

In testimony whereof I have signed my name to this specification in the presence of two subscribing witnesses.

EDGAR WARD DANA.

Witnesses:
Wm. J. Boll,
L. A. Brunckhorst.